No. 838,310. PATENTED DEC. 11, 1906.
W. D. EVANS.
COW COVER.
APPLICATION FILED JUNE 15, 1905.
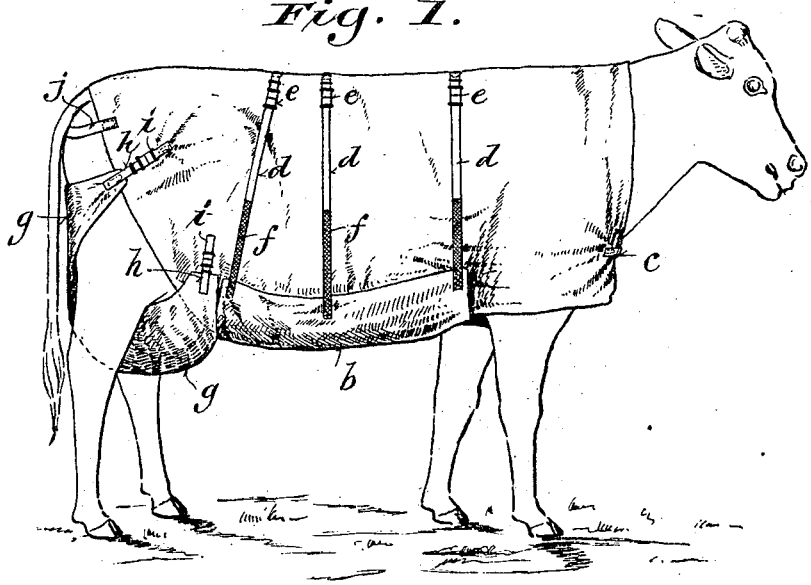
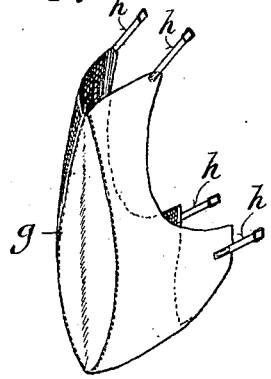
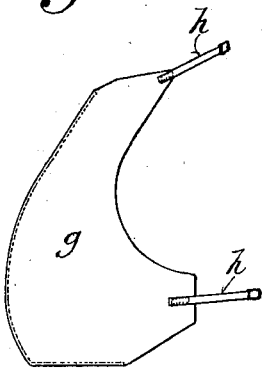

UNITED STATES PATENT OFFICE.

WILLIAM D. EVANS, OF CHICAGO, ILLINOIS.

COW-COVER.

No. 838,310.  Specification of Letters Patent.  Patented Dec. 11, 1906.

Application filed June 15, 1905. Serial No. 265,453.

*To all whom it may concern:*

Be it known that I, WILLIAM D. EVANS, a citizen of the United States, residing at Chicago, in the county of Cook and State of Illinois, have invented certain new and useful Improvements in Cow-Covers, of which the following is a specification, reference being had to the accompanying drawings, forming a part thereof.

The main objects of this invention are to protect cows, and particularly their milk-veins, against flies, mosquitos, and the like and against cold or chilly weather, and by thus relieving them from the worry caused by such insects and from the effects of changes in the weather to increase the yield and improve the quality of their milk; to provide a simple inexpensive cover which can be easily applied to the animal, will stay in place when so applied, and will readily accommodate itself to the varying girth of the animal; to supply such a cover with a detachable udder-protector to shield the udder and teats against cold and filth, and generally to improve the construction and operation of devices of this class.

It consists in certain novel features of construction and in the peculiar arrangement and combinations of parts, as hereinafter particularly described, and pointed out in the claims.

In the accompanying drawings like letters designate the same parts in the several figures.

Figure 1 is a view of a cover and udder-protector embodying the invention as applied to a cow. Fig. 2 is a perspective view of the udder-protector detached, and Fig. 3 is a side elevation of the same.

Referring to Fig. 1, the cover $a$, which may be made of burlap, canvas, or any other suitable fabric, is made to extend at the front end well forward over the neck of the animal and is cut sufficiently narrow to terminate above and out of reach of the knees of the cow, and thereby avoid interfering with her lying down and getting up, besides preventing her from tearing the cover in so doing. At the rear end the cover is made to slant forward on both sides from the rump, so as to expose the haunches of the animal and permit the sides of the cover to pass in front of the hind legs below the belly, thereby preventing soiling the skirts of the cover when the animal lies down.

On one side the cover is formed or provided with a flap or extension $b$, which is adapted to pass under the belly between the udder and fore legs of the animal and to lap the other side of the cover, thereby forming a shield which protects the belly and milk-veins against insects—such as flies, mosquitos, and gnats—as well as against cold or chilly weather. The cow thus protected from annoyance from insects and the discomfort of cold can graze or feed undisturbed and will give more and better milk.

The cover is provided with breast straps or fastenings $c$ for holding it in place around the neck and over the breast and with a tail cord, band, or crupper $j$ to prevent its slipping forward, particularly when the udder-protector, hereinafter described, is not used. It is also provided with girth-bands $d$ and fastenings $e$ for holding it and the belly-flap $b$ in place on the animal.

To allow for the ordinary and considerable variation in the girth of the animal, which is usually gaunt in the morning and distended at night, some or all, preferably the rear girth-bands $d$, are made of elastic material or provided with elastic sections $f$. These elastic bands or sections permit the cover to expand and contract with the distention and shrinkage of the animal's belly without injury to the cover or its fastenings and without discomfort to the animal.

To keep the udder and teats clean and to protect them against insects and cold, the cover may be provided with a detachable udder-protector $g$. This is made in the form of an oblong bag from fabric like that of the cover itself or from other suitable flexible material. It is fitted to the belly and around the udder and is extended at the corners, which are provided with straps or other suitable fastenings $h$ for securing it to the cover $a$, which is provided with corresponding straps or fastenings $i$ adjacent to the hips and groins of the animal. The upper rear end of the protector, which is left open, extends when in place upwardly behind the udder, and the upper rear corners are carried forward around the hind legs and attached to the cover near the hips of the animal, thus completely inclosing and protecting the udder.

The cover may be used with or without the udder-protector, and when the protector is used it can be readily attached and detached. For milking it is sufficient to detach either the front or rear fastenings to expose the teats.

Various changes in minor details of construction may be made without departing from the principle and intended scope of the invention.

I claim—

1. A cow-cover having a flap or extension on one side adapted to pass underneath and shield the belly between the udder and fore legs and to lap the opposite side of the cover, the rear end of the cover slanting from the rump forward so as to expose the haunches of the animal, and breast and girth fastenings for holding the cover with its belly-flap in place on the animal, substantially as described.

2. A cow-cover having a flap or extension on one side adapted to pass underneath the belly and to lap the other side, the rear end of the cover slanting from the rump forward so as to expose the haunches and allow the sides to pass under the belly in front of the hind legs of the animal; and girth-fastenings for holding the cover with its flap in place on the animal, the rear fastening being elastic or yielding, substantially as described.

3. A cow-cover having a flap or extension on one side adapted to pass underneath the belly and to lap the other side, the rear end of the cover slanting from the rump forward so as to expose the haunches and allow the sides of the cover to pass under the belly in front of the hind legs of the animal, and bands provided with fastenings for holding the cover with its flap in place on the animal, the rear girth-band having an elastic section, substantially as described.

4. A cow-cover terminating in front above and out of reach of the knees of the animal, slanting at the rear end forwardly from the rump on both sides and having a flap on one side adapted to pass under the belly and lap the other side, and breast and girth bands and fastenings adapted to hold the cover with its belly-flap in place on the animal, substantially as described.

5. A cow-cover having a flap on one side adapted to pass under the belly between the udder and fore legs of the animal and lap the other side, and provided with a detachable udder-protector and with fastenings for securing said protector to the cover adjacent to the hips and groins of the animal, the rear end of the protector being made to extend upwardly behind the udder, and the rear corners to extend forwardly around the hind legs of the animal, substantially as described.

6. A cow-cover having a flap on one side adapted to pass under the belly between the udder and fore legs of the animal and to lap the other side, and provided with yielding girth-fastenings for holding the cover and its flap in place on the animal and allowing for variation in its girth, in combination with an udder-protector consisting of a bag having upwardly and forwardly extended front and rear corners provided with fastenings for securing it to said cover, which is provided with corresponding fastenings adjacent to the hips and groins of the animal, the side edges of the protector being formed to pass around the inner sides of the hind legs from and to points adjacent to the groin and hip fastenings on the cover, substantially as described.

7. A cow-cover having fastenings for holding it in place on the animal and provided with a detachable udder-protector and with fastenings for securing the protector thereto, the rear end of the protector being made to extend upwardly behind the udder, and the rear corners to extend forwardly around the hind legs of the animal, substantially as described.

In witness whereof I hereto affix my signature in presence of two witnesses.

WILLIAM D. EVANS.

Witnesses:
A. W. MILLER.
W. ARCHER LAKE.